US006865945B2

(12) United States Patent
Hayashi et al.

(10) Patent No.: US 6,865,945 B2
(45) Date of Patent: Mar. 15, 2005

(54) ANGULAR VELOCITY SENSOR

(75) Inventors: Michihiko Hayashi, Fukui (JP); Hirofumi Tajika, Osaka (JP); Masaya Nakatani, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/485,073

(22) PCT Filed: Jun. 5, 2003

(86) PCT No.: PCT/JP03/07115
§ 371 (c)(1),
(2), (4) Date: Jan. 28, 2004

(87) PCT Pub. No.: WO03/104749
PCT Pub. Date: Dec. 18, 2003

(65) Prior Publication Data
US 2004/0187574 A1 Sep. 30, 2004

(30) Foreign Application Priority Data

Jun. 10, 2002 (JP) .................................... 2002-168757
Oct. 22, 2002 (JP) .................................... 2002-306938

(51) Int. Cl.$^7$ ............................ G01P 9/04; H01L 41/08
(52) U.S. Cl. ................................... 73/504.16; 310/360
(58) Field of Search ........................ 310/360, 357, 310/358, 321, 366, 370; 73/504.16, 504.12, 504.13, 504.14, 504.15, 504.02, 504.04

(56) References Cited
U.S. PATENT DOCUMENTS 5,438,231 A   8/1995   Khoshnevisan et al.

FOREIGN PATENT DOCUMENTS

| JP | 5-133752 | * | 5/1993 |
| JP | 8-327364 | | 12/1996 |
| JP | 9-105634 | | 4/1997 |
| JP | 10-19574 | | 1/1998 |
| JP | 10-339637 | | 12/1998 |
| JP | 2001-148522 | | 5/2001 |

OTHER PUBLICATIONS

K. Maenaka et al., "Analysis of a highly sensitive silicone gyroscope with cantilever beam as vibrating mass", Sensors and Actuators A 54, 1996, pp. 568–573, Fig. 10.

H. Chen et al., "A Piezoresistive Accelerometer with a Novel Vertical Beam Structure", Transducers '97, 1997, pp. 1201–1204, Fig. 2.

* cited by examiner

Primary Examiner—Helen Kwok
(74) Attorney, Agent, or Firm—Wenderoth, Lind & Ponack, L.L.P.

(57) ABSTRACT

An angular velocity sensor, which is able to reduce the variations of driving resonance frequency of the vibrator and to improve the reliability of the sensitivity of detection signal with respect to the angular velocity applied, is provided. The angular velocity sensor comprises a vibrator, and a tuning-fork as the vibrator is formed of a silicone substrate with crystal orientation (100) as its main face, and a side face nearly perpendicular to the driving direction (X direction) of the arm of the tuning-fork corresponds to a crystal orientation where the elastic modulus is less dependent on azimuth angle.

15 Claims, 6 Drawing Sheets

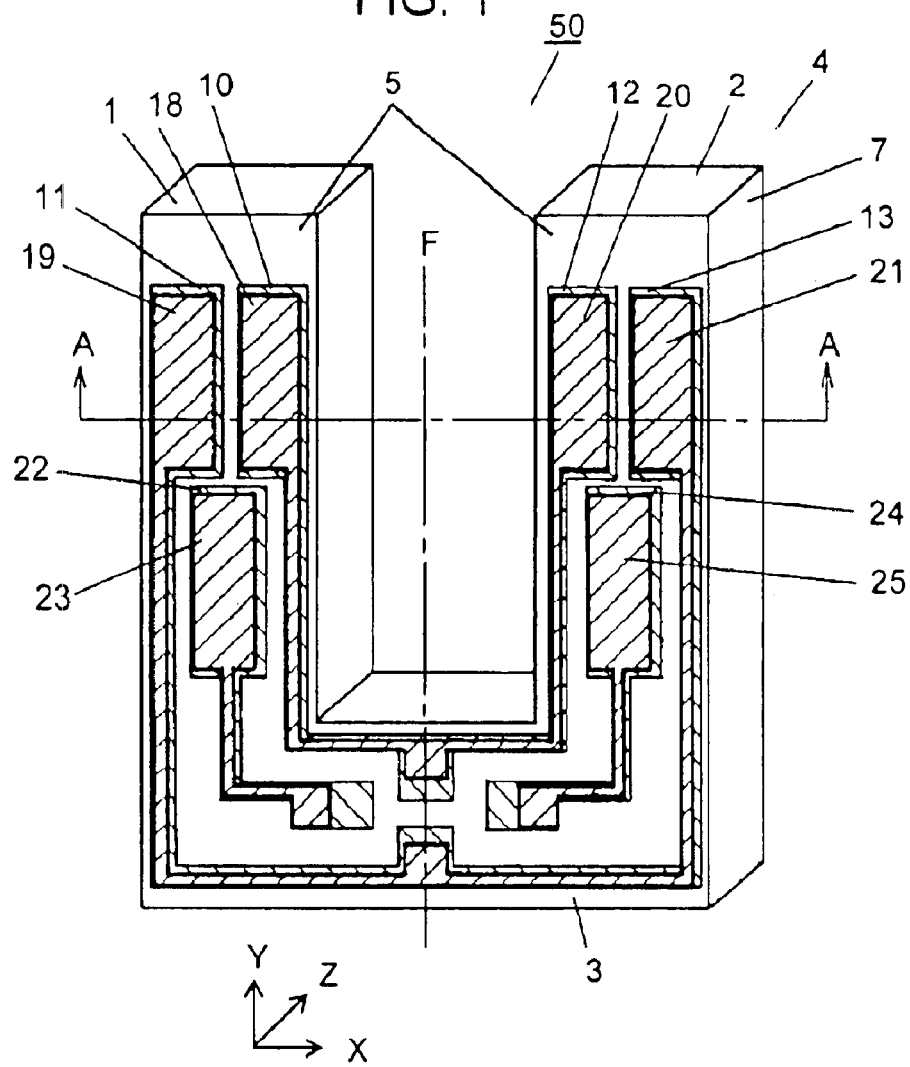
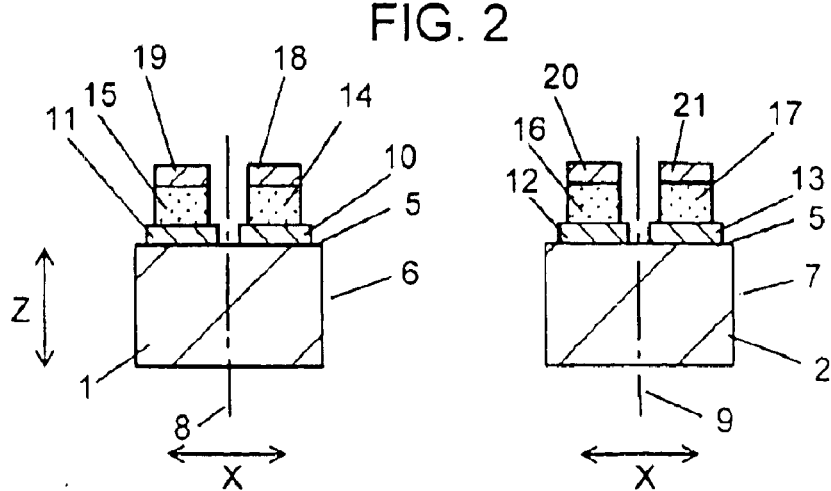

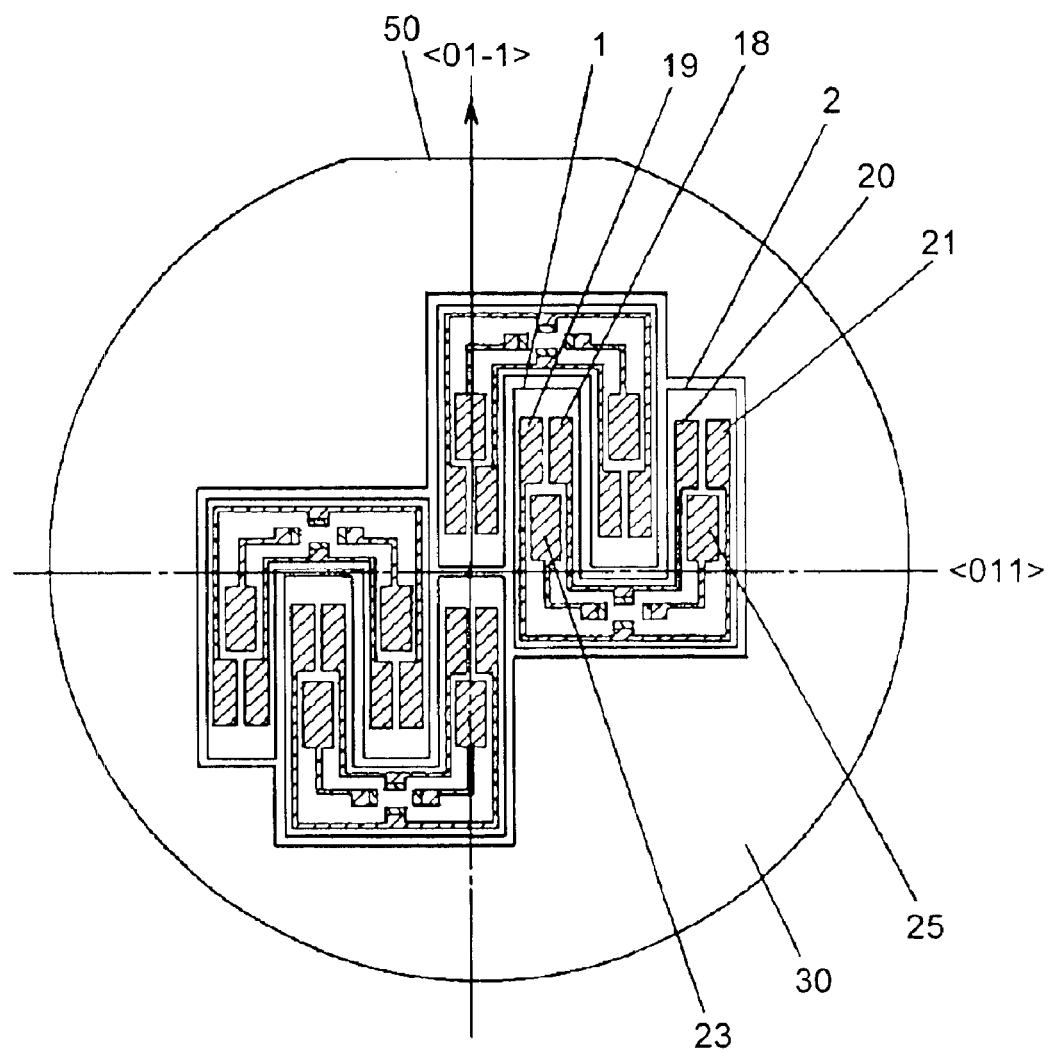

ANGULAR VELOCITY SENSOR

TECHNICAL FIELD

The present invention relates to an angular velocity sensor used in an attitude control, navigation system or the like such as an aircraft, automobile, robot, ship, vehicle, etc.

BACKGROUND ART

As a conventional angular velocity sensor, well-known is the one disclosed in U.S. Pat. No. 5,438,231. The angular velocity sensor will be described with reference to FIG. 8.

FIG. 8 is a perspective view of a conventional angular velocity sensor. In FIG. 8, angular velocity sensor 101 comprises tuning-fork 102 made from non-piezoelectric material such as silicone, lower electrode 106 disposed on arm 103, arm 104, and substrate 105, lower electrode 107 disposed on arm 104, piezoelectric thin film 108 disposed on lower electrode 106, piezoelectric thin film 109 disposed on lower electrode 107, upper electrode 110 and upper electrode 111 disposed on piezoelectric thin film 108, upper electrode 112 and upper electrode 113 disposed on piezoelectric thin film 109. And, applying AC voltage the upper electrodes 110, 111, 112, and 113 causes the tuning-fork 102 to resonate.

The tuning-fork 102 of the above angular velocity sensor 101 has two perpendicular oscillation modes (an oscillation mode in the X direction and an oscillation mode in the Z direction). The tuning-fork 102 is driven in only one oscillation mode (for example, the oscillation mode in the X direction). In this condition, when rotational angular velocity is applied about the axis (Y axis) perpendicular to the axes (X axis, Z axis) of the two perpendicular oscillation modes, the tuning-fork 102 is excited in another (Z-direction) oscillation mode due to Corioli's force. The angular velocity sensor 101 utilizes this principle. In the configuration of such angular velocity sensor 101, in order to obtain a highly reliable detection signal with respect to the angular velocity applied, the resonance frequencies in the two perpendicular oscillation modes (the oscillation mode in the X direction and oscillation mode in the Z direction) of the tuning-fork 102 are required to be apart from each other. However, for improving the sensitivity of the detection signal with respect to the angular velocity applied, it is advantageous that the resonance frequencies in the two perpendicular oscillation modes (the oscillation mode in the X direction and the oscillation mode in the Z direction) of the tuning-fork 102 are close to each other. That is, from the viewpoint of reliability and sensitivity of the detection signal with respect to the angular velocity applied, it is desirable that the two resonance frequencies are close enough to each other so that they are free from coupling. However, regarding the sensitivity and reliability of the detection signal with respect to the angular velocity applied, there have been no documents that include considerations from the viewpoints of difference in elastic modulus depending upon the crystal orientation of the material for the tuning-fork and of resonance frequencies, including the above-mentioned U.S. Pat. No. 5,438,231.

The above-mentioned matter is described in detail in the following. Resonance frequency f is represented by (formula 1), where c is elastic modulus, ρ is density, d is arm width, and l is arm length.

$$f \propto \sqrt{(c/\rho)} * d/l^2 \quad \text{(formula 1)}$$

In the above (formula 1), it is clear that the resonance frequency in the X-direction direction oscillation mode of the tuning-form 102 varies with elastic modulus c. In the case of the conventional angular sensor, there has been a problem that elastic modulus c in the X direction (driving direction) of the tuning-fork 102 varies depending upon the face selected as a crystal orientation at the side of arm 103, 104, resulting in variation of the sensitivity of detection signal with respect to the angular velocity applied and lowering the reliability.

DISCLOSURE OF THE INVENTION

An angular velocity sensor comprising a vibrator, wherein the vibrator is formed of a silicone substrate having a crystal orientation (100) as a main face, and a face nearly perpendicular to the driving direction of the vibrator corresponds to a crystal orientation where the elastic modulus is less in variation as against deflection of azimuth angle.

BRIEF DESCRIPTION OF THE DRAWINGS

FIG. 1 is a perspective view of a preferred embodiment 1 of the angular velocity sensor of the present invention.

FIG. 2 is a sectional view along line A—A of the angular velocity sensor shown in FIG. 1.

FIG. 7 is a layout in the silicone substrate in a preferred embodiment 2 of the angular velocity sensor of the present invention.

DETAILED DESCRIPTION OF THE PREFERRED EMBODIMENTS

The present invention is intended to solve the above problems of the conventional system, and the object of the invention is to provide an angular velocity sensor which is able to reduce the variations of driving resonance frequency of the vibrator and to improve the reliability of the sensitivity of detection signal with respect to the angular velocity applied.

The preferred embodiments of the present invention will be described in the following with reference to FIG. 1 to FIG. 7. The angular velocity sensor of the present invention has a vibrator, but in the preferred embodiment shown below, an example using a tuning-fork as a vibrator is described.

(Preferred Embodiment 1)

Figure 3:
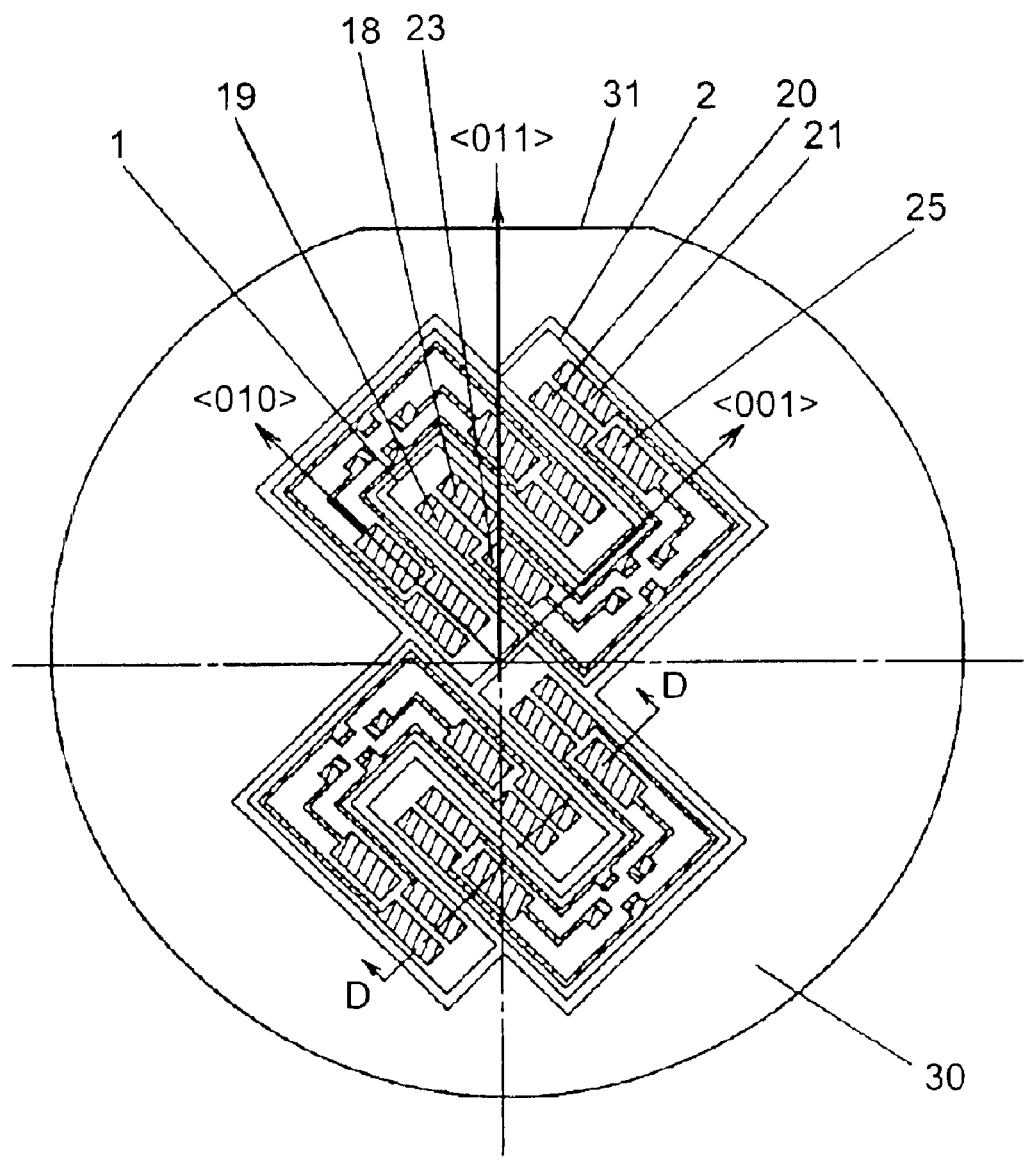
FIG. 3 is a layout drawing of angular velocity sensors in a silicone substrate in the present invention.
Figure 4:
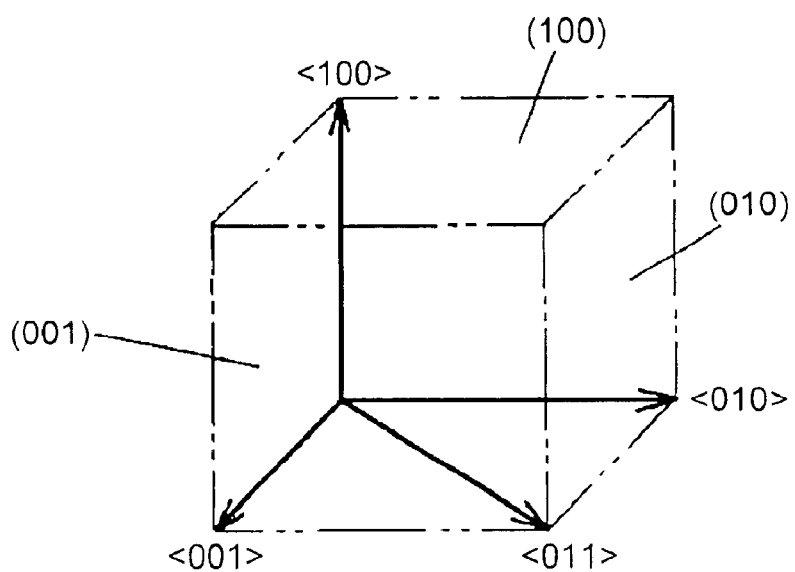
FIG. 4 is a crystal orientation diagram of a silicone substrate.
Figure 5:
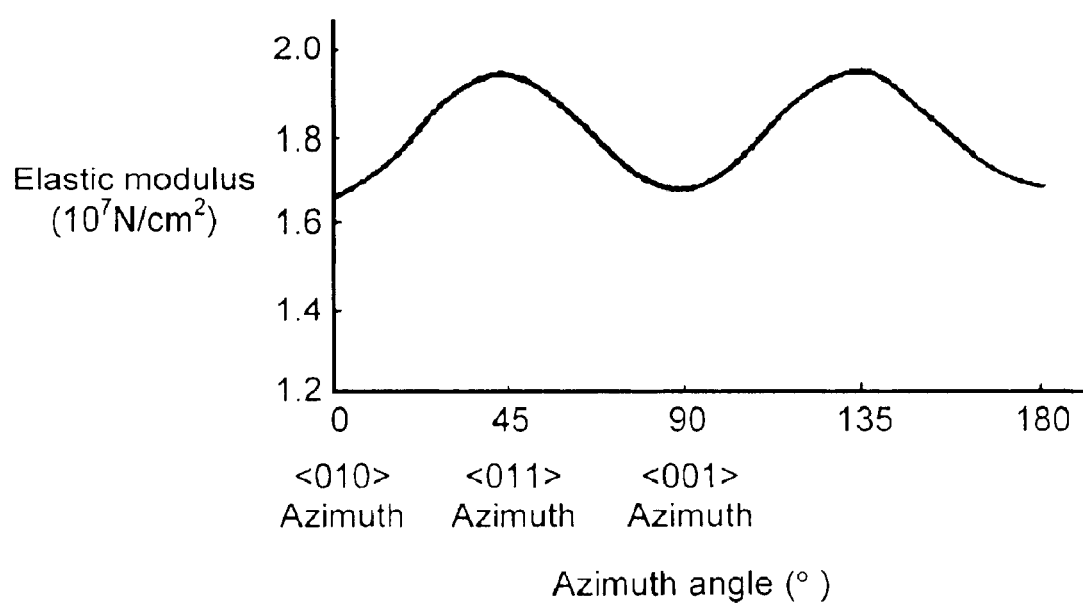
FIG. 5 is a characteristic graph showing the relationship between elastic modulus and azimuth of the silicone substrate.

FIG. 1 is a perspective view of an angular velocity sensor in the preferred embodiment 1 of the present invention. FIG. 2 is a sectional view of the angular velocity sensor along the line A—A of FIG. 1. FIG. 3 is a layout drawing of angular velocity sensors in a silicone substrate. FIG. 4 is a crystal orientation diagram of the silicone substrate shown in FIG. 3. FIG. 5 is a characteristic graph showing the relationship between the elastic modulus and azimuth angle of the silicone substrate shown in FIG. 3.

Arrow X, arrow Y, and arrow Z of FIG. 1 represent three perpendicular directions respectively. Also, in the following description, the arrow X, arrow Y, and arrow Z are respectively referred to as direction X, direction Y, and direction Z as well. As shown in FIG. 1, FIG. 2, and FIG. 3 tuning-fork 4 as a vibrator having two parallel arms, arm 1 and arm 2, and base 3 which connects these two arms, arm 1 and arm 2, is made of silicone that is a non-piezoelectric material. Main face 5 of tuning-fork 4 corresponds to crystal orientation (100) of silicone substrate 30. Also, on the basis of orientation-flat 31 of silicone substrate 30 shown in FIG. 3, the main face 5 is configured in that respective side 6 and side 7 of the arm 1 and arm 2 correspond to crystal orientation (001), and a face perpendicular to the lengthwise direction (Y direction) of arm 1 and arm 2 corresponds to crystal orientation (010). The first electrode 10 is located at the main face 5 of arm 1 and disposed inside the center line 8 of arm 1. The second electrode 11 is located at the main face 5 of arm 1 and disposed outside the center line 8. The first electrode 10 and the second electrode 11 are spaced apart from each other. The first electrode 12 is located at the main face 5 of arm 2 and disposed inside the center line 9 of arm 2. The second electrode 13 is located at the main face 5 of arm 2 and disposed outside the center line 9. The first electrode 12 and the second electrode 13 are spaced apart from each other. The first piezoelectric thin films 14, 16 are located inside the center lines 8, 9 respectively, and disposed on the first electrodes 10, 12 respectively. The second piezoelectric thin films 15, 17 are located outside the center lines 8, 9 respectively, and disposed on the second electrodes 11, 13 respectively. The third electrodes 18, 20 are disposed on the first piezoelectric thin films 14, 16 respectively. The fourth electrodes 19, 21 are disposed on the second piezoelectric thin films 15, 17 respectively.

The driving section comprises the first electrodes 10, 12, the second electrodes 11, 13, the first piezoelectric thin films 14, 16, the second piezoelectric thin films 15, 17, the third electrodes 18, 20, and the fourth electrodes 19, 21.

The fifth electrode 22 is located at the main face 5 of arm 1 and disposed a little closer to the base 3. Also, the fifth electrode 22 is spaced apart from the first electrode 10 and the second electrode 11. The sixth electrode 23 is disposed on the third piezoelectric thin film 26 disposed on the fifth electrode 22. The third piezoelectric thin film 26 is hidden by the sixth electrode 23 and invisible in FIG. 1 and FIG. 3, but it is revealed in the sectional view of FIG. 6D. Similarly, the fifth electrode 24 is located at the main face 5 of arm 2 and disposed a little closer to base 3. Also, the fifth electrode 24 is spaced apart from the first electrode 12 and the second electrode 13. The sixth electrode 25 is disposed on the third piezoelectric thin film 27 disposed on the fifth electrode 24. The third piezoelectric thin film 27 is hidden by the sixth electrode 25 and invisible in FIG. 1 and FIG. 3, but it is revealed in the sectional view of FIG. 6D.

The detecting section comprises the fifth electrodes 22, 24, the third piezoelectric thin films 26, 27, and the sixth electrodes 23, 25.

The angular velocity sensor 50 is configured as described above.

The operational principle of the angular velocity sensor 50 will be described in the following.

In FIG. 1 and FIG. 2, when DC voltage of about 20V is applied respectively between the first electrode 10 and the third electrode 18, between the first electrode 12 and the third electrode 20, between the second electrode 11 and the fourth electrode 19, and between the second electrode 13 and the fourth electrode 21, then polarization takes place in a constant direction with respect to the first piezoelectric thin films 14, 16 and the second piezoelectric thin films 15, 17. Similarly, when DC voltage of about 20V is applied respectively between the fifth electrode 22 and the sixth electrode 23, and between the fifth electrode 24 and the sixth electrode 25, then polarization takes place in a constant direction with respect to the third piezoelectric thin films 26, 27.

For example, when DC voltage is applied so that the first electrodes 10, 12, the second electrodes 11, 13, and the fifth electrodes 22, 24 become higher in electric potential, then the polarization of the first piezoelectric thin films 14, 16, the second piezoelectric thin films 15, 17, and the third piezoelectric thin films 26, 27 takes place in a direction from the first electrodes 10, 12, the second electrodes 11, 13, and the fifth electrodes 22, 24 toward the third electrodes 18, 20, the fourth electrodes 19, 21, and the sixth electrodes 23, 25. The direction of polarization is maintained in a constant direction even with the application of DC voltage discontinued. This is called spontaneous polarization. In case the first piezoelectric thin films 14, 16, the second piezoelectric thin films 15, 17, and the third piezoelectric thin films 26, 27 have such spontaneous polarization, and the third electrodes 18, 20, the fourth electrodes 19, 21, and the sixth electrodes 23, 25 are higher in electric potential than the first electrodes 10, 12, the second electrodes 11, 13, and the fifth electrodes 22, 24, then the first piezoelectric thin films 14, 16, the second piezoelectric thin films 15, 17, and the third piezoelectric thin films 26, 27 respectively act in the direction of relieving the polarization. Accordingly, the first piezoelectric thin films 14, 16, the second piezoelectric thin films 15, 17, and the third piezoelectric thin films 26, 27 shrink in a direction parallel with polarization and expand in a direction perpendicular thereto. On the contrary, in case the third electrodes 18, 20, the fourth electrodes 19, 21, and the sixth electrodes 23, 25 are lower in electric potential than the first electrodes 10, 12, the second electrodes 11, 13, and the fifth electrodes 22, 24, then the first piezoelectric thin films 14, 16, the second piezoelectric thin films 15, 17, and the third piezoelectric thin films 26, 27 expand in a direction parallel with polarization and shrink in a direction perpendicular thereto.

Accordingly, the first electrode 10 being a GND electrode or a virtual GND electrode, when AC voltage is applied to the third electrode 18, the first piezoelectric thin film 14 expands and shrinks in the Y-axis direction. Described above is the driving section arranged inside on the arm 1, and similar operations are executed with respect to the driving section disposed outside on the arm 1, and the driving sections disposed inside and outside on the arm 2.

Also, with AC voltages different in phase by 180° from each other applied to the third electrode 18 and the fourth electrode 19 shown in FIG. 1 and FIG. 2, the first piezoelectric thin film 14 expands, while the second piezoelectric thin film 15 shrinks. On the contrary, when the first piezoelectric thin film 14 shrinks, the second piezoelectric thin film 15 expands.

On the basis of the above principles, AC voltages the same in phase being applied to the third electrodes 18, 20, and opposite in phase to the third electrodes 18, 20 being applied to the fourth electrodes 19, 21, the arm 1 and the arm 2 are subjected to tuning-fork oscillation in a direction (X direction) opposite to each other.

Also, the arms 1, 2 have resonance frequencies depending upon the shape. When the frequency of AC voltage applied to the third electrodes 18, 20 and the fourth electrodes 19, 21 is equalized to the resonance frequency of the shape, the arms 1, 2 are driven to resonate in the X direction (driving direction) of the arm 1, 2. When angular velocity is applied along Y axis in a state of resonation in the X direction (driving direction), the arms 1, 2 flex reversely to each other in the Z direction (detecting direction) due to Corioli's force. Such flexure causes reverse electric charge to be generated at the third piezoelectric thin films 26, 27 respectively disposed on the arms 1, 2. The reverse electric charge is detected by the sixth electrodes 23, 25, thereby obtaining an output corresponding to the angular velocity applied.

The arm 1, 2 has an oscillation mode for moving in the X direction (driving direction) and an oscillation mode for moving in the Z direction (detecting direction). With the two oscillation modes set to the same frequency, resonance is generated at the detection side (Z direction) as well due to driving resonation, and it becomes difficult to distinguish distortion generated due to Corioli's force. Therefore, it is necessary to suppress the coupling of resonance frequency at the detection side (Z direction) and resonance frequency at the driving side (X direction) by setting the resonance frequency at the detection side (Z direction) to a level slightly different from the resonance frequency at the driving side (X direction).

However, if the frequency is set to a greatly different level, even when Corioli's force is generated at the detection side (Z direction), great oscillation will not be generated at the detection side (Z direction) because the reconance frequency at the detection side (Z direction) is apart from the resonance frequency at the driving side (X direction). That is, it is necessary to set the resonance frequency at the driving side (X direction) and the resonance frequency at the detection side (Z direction) apart from each other to such extent that they are free from coupling, and to set both frequencies close to each other in order to enhance the sensitivity at the detection side (Z direction).

In the present preferred embodiment, an example of a configuration wherein the width in the driving direction (X direction) of the arm 1, 2 is greater than the thickness in the detecting direction (Z direction) is described in the following. As shown in FIG. 2 as an example, the width of arm 1, 2 is 0.2 mm, and the thickness is 0.19 mm. The resonance frequency in the driving direction (X direction) of the tuning-fork 4 is 22 kHz for example, and the resonance frequency in the detecting direction (Z direction) is 20 kHz for example.

As shown in FIG. 4, the crystal orientation (100), crystal orientation (010), and crystal orientation (001) of silicone are in perpendicular relation with each other, and <010> azimuth and <011> azimuth, <011> azimuth and <001> azimuth are respectively 45° different from each other.

Also, FIG. 5 shows the relationship between the face angle and elastic modulus of silicone. The horizontal axis represents the azimuth angle on the basis of <010> azimuth, and the vertical axis represents the elastic modulus. As shown in FIG. 5, the elastic modulus of crystal orientation (100) silicone, near <010> azimuth (around azimuth angle 0°), near <011> azimuth (around azimuth angle 45°), and near <001> azimuth (around azimuth angle 90°), is less in variation as against the azimuth angle. <010> azimuth and <001> azimuth are the same in elastic modulus. Thus, regarding the elastic modulus of silicone of crystal orientation (100), in cycles of azimuth angle 45°, the elastic modulus is rather less dependent on the azimuth angle, and elastic modulus itself varies in cycles of face angle 90°. That is, as shown in FIG. 3, the lengthwise direction (Y direction) of the arm 1, 2 of the tuning-fork 4 three-dimensionally formed by using the silicone substrate 30 of crystal orientation (100) is configured to be <010> azimuth, and then, the driving direction (X direction) of the tuning-fork 4 corresponds to <001> azimuth. Also, since the detecting direction (Z direction) is <100> azimuth, in the driving mode in the driving direction (X direction) and detecting direction (Z direction), the elastic modulus can be nearly equalized and it is possible to lessen the variation of elastic modulus as against the deflection of azimuth angle. Accordingly, the variation of resonance frequency in the driving direction (X direction) is reduced and the accuracy can be improved, and as a result the sensitivity of detection signal of the angular velocity applied will be improved in reliability. Also, similar effects can be obtained when the lengthwise direction (Y direction) of arm 1, 2 of the tuning-fork 4 is configured to be <001> azimuth so that the driving direction (X direction) corresponds to <010> azimuth.

In the above description, aiming at the crystal orientation (100), the relationship between azimuth <100>, azimuth <010>, and azimuth <001> at crystal orientation (100) and elastic modulus is described. Also in the case of crystal orientation (010) or crystal orientation (001), elastic modulus varies depending upon azimuth <100>, azimuth <010>, and azimuth <001>. This is because the crystallizability of silicone has a symmetrical axis, and <100>, <010> and <001> are symmetrical axes. Therefore, in the present invention, the main face is (100), but it is also preferable to be (010) or (001). And in this case, only the name of azimuth is changed for convenience sake, including no substantial differences at all. Namely, when a crystal orientation is determined, it directly determines the corresponding three azimuths. And also, at the two crystal orientations, the relationship between azimuth angle and elastic modulus is equivalent to the relationship shown in FIG. 5.

Next, the method of manufacturing an angular velocity sensor in the present preferred embodiment will be described in the following.

FIG. 6A to FIG. 6H are the manufacturing steps described by using the D—D section of the angular velocity sensor shown in FIG. 3.

Figure 6A:
FIG. 6A to FIG. 6H show the manufacturing steps described by using a section D—D of FIG. 3 for the angular velocity sensor of the present invention.
Figure 6B:
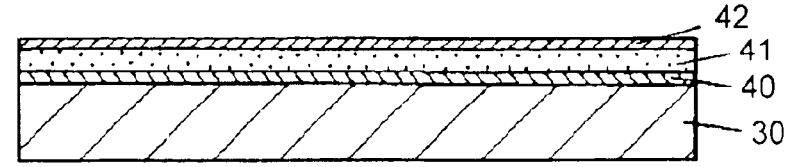

As shown in FIG. 6A, silicone substrate 30 of crystal orientation (100) and about 200 μm in thickness is prepared. Subsequently, as shown in FIG. 6B, an alloy layer of noble metal and liable-to-oxidize material is formed in thickness of about 2000 Å by sputtering or vacuum evaporation on the main face 5 of silicone substrate 30. As the alloy layer of noble metal and liable-to-oxidize material, platinum (Pt)-titanium (Ti), iridium (Ir)-titanium (Ti) or the like is available. Lower electrode layer 40 is formed in this way. Further, a piezoelectric thin film 41 is formed on the lower electrode layer 40 by sputtering piezoelectric material such as lead titanate zirconate (PZT) in a thickness of about 1 to 4 μm. An upper electrode layer 42 is formed on the piezoelectric thin layer 41 by sputtering or vacuum evaporation. The upper electrode layer 42 is made from materials such as gold (Au), chrome (Cr), aluminum (Al), copper (Cu), and titanium (Ti) in thickness of about 2000 Å.

Figure 6C:
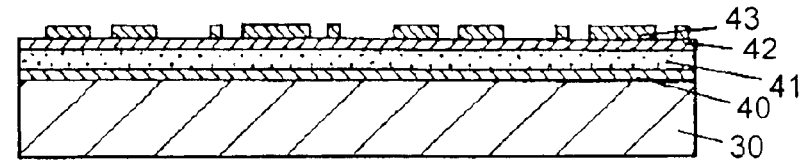
Figure 6D:
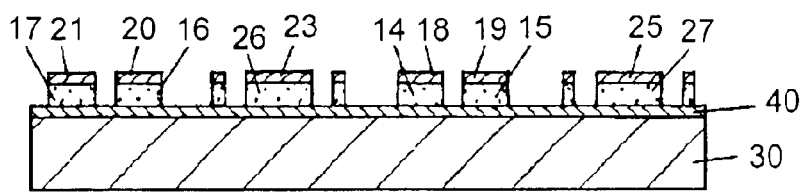
Figure 6E:
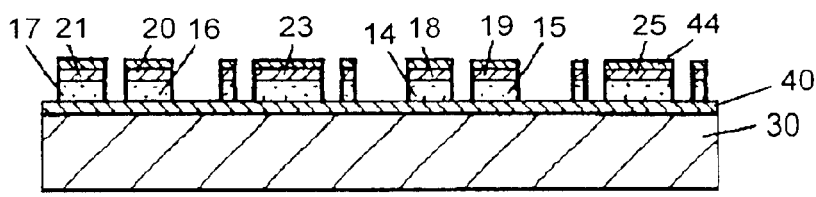
Figure 6F:
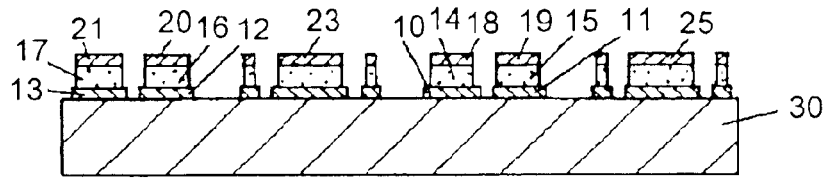

Next, as shown in FIG. 6C, resist 43 is patterned on upper electrode layer 142. The resist 43 is patterned for the purpose of forming the predetermined shapes, that is, the third electrode 18, 20, the fourth electrode 19, 21, the sixth electrode 23, 25, the first piezoelectric thin film 14, 16, the second piezoelectric thin film 15, 17, and the third piezoelectric thin film 26, 27 by means of photolithography technology. Subsequently, the upper electrode layer 42 and the piezoelectric thin film 41 are etched as shown in FIG. 6D. And, as shown in FIG. 6E, the resist 44 is patterned. The resist 44 is formed for the purpose of forming the predetermined shapes, that is, the first electrode 10, 12, the second electrode 11, 13, and the fifth electrode 22, 24 by means of photolithography technology. The resist 44 is formed and patterned so as to cover the third electrode 18, 20, the fourth electrode 19, 21, the sixth electrode 23, 25, the first piezoelectric thin film 14, 16, the second piezoelectric thin film 15, 17, and the third piezoelectric thin film 26, 27. Thus, the lower electrode layer 40 is etched into a predetermined shape as shown in FIG. 6F.

Figure 6G:
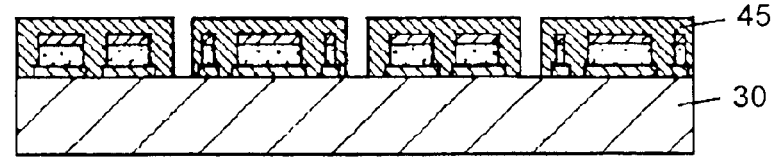

Next, as shown in FIG. 6G, resist 45 is patterned, which is formed so as to cover the first electrode 10, 12, the second electrode 11, 13, the fifth electrode 22, 24, the first piezoelectric thin film 14, 16, the second piezoelectric thin film 15, 17, the third piezoelectric thin film 26, 27, the third electrode 18, 20, the fourth electrode 19, 21, the sixth electrode 23, 25, and the main face 5 of silicone substrate 30. The resist 45 is patterned for the purpose of forming the tuning-fork 4 made from silicone of a predetermined shape by using photolithography technology. And, as shown in FIG. 6H, the silicone substrate 30 is subjected to inductive coupling type reactive ion etching.

In the above method of manufacturing an angular velocity sensor, when the resist 43, 44, and 45 shown in FIG. 6C, FIG. 6E, and FIG. 6G are patterned, the position of orientation-flat 31 is <011> azimuth as shown in FIG. 3, and the position of the orientation-flat 31 is adjusted in relation with the photo mask, patterning is executed so that the side faces 46, 47 of the arms 1, 2 correspond to crystal orientation of (001). Also, since the width of arm 1, 2 shown in FIG. 6H is a little greater than the thickness of silicone substrate 30, the resonance frequency of the driving side (X direction) is higher than the resonance frequency of the detecting side (Z direction).

When the induction coupling type reactive ion etching is executed on the silicone substrate 30, two kinds of gasses are used at least. Two or more kinds of gasses at least include a gas that promotes etching and a gas that suppresses etching. Thus, the promotion and suppression of etching can be accurately executed. As a result, etching can be executed only in a direction perpendicular to the main face 5 of silicone substrate 30. Subsequently, side faces 46, 47 perpendicular to the main face 5 of silicone substrate 30 can be obtained.

Figure 6H:
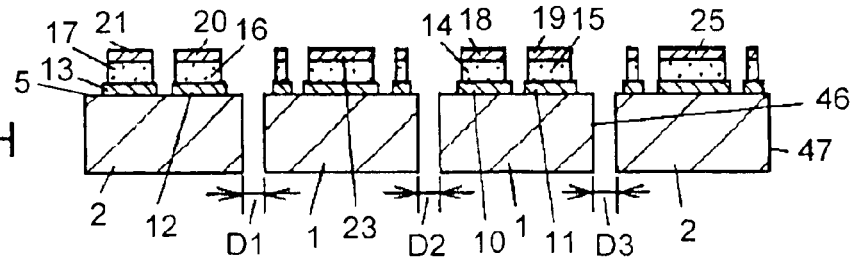
Figure 8:
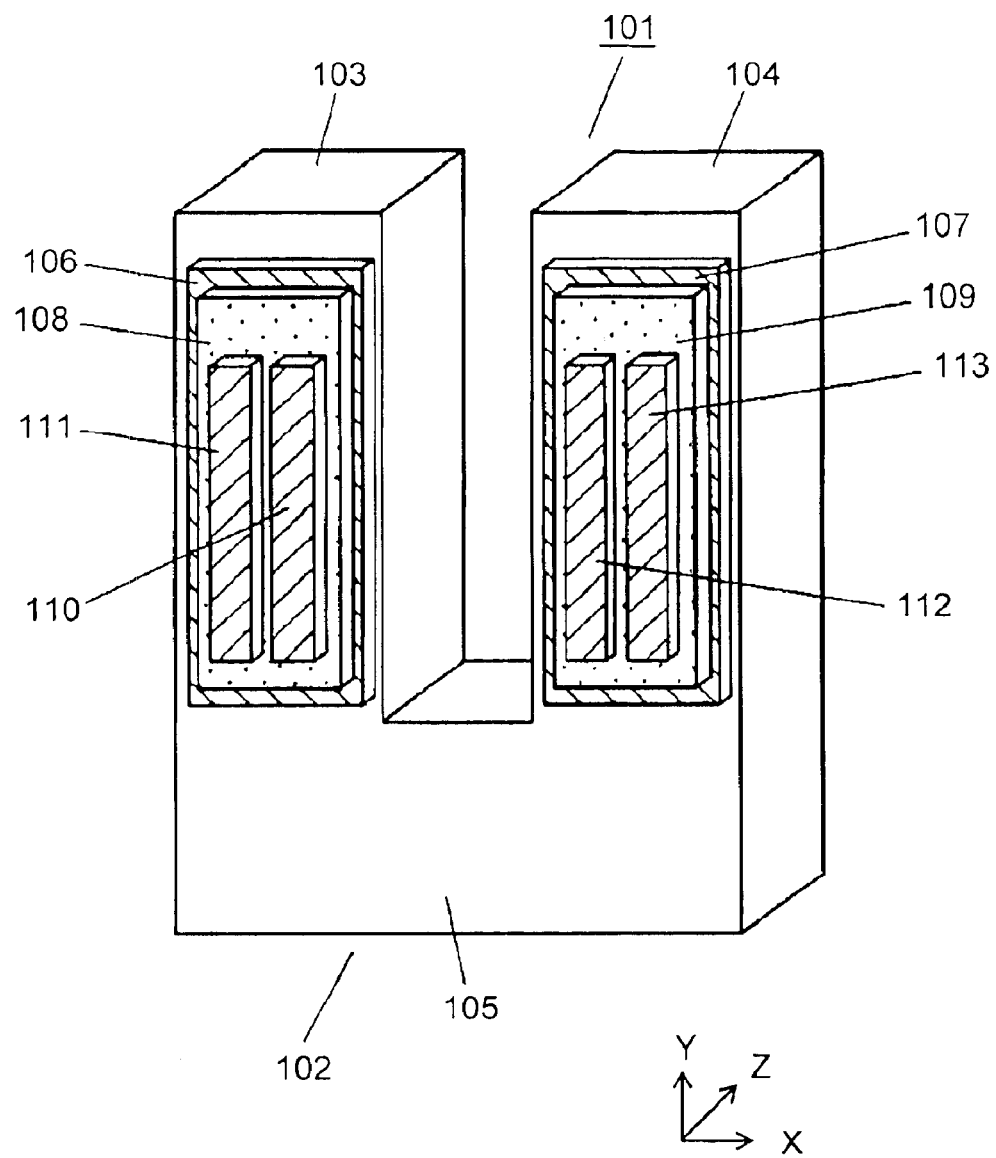
FIG. 8 is a perspective view of a conventional angular velocity sensor.

Further, as shown in FIG. 6H, tuning-forks 4 are arranged in the silicone substrate 30 at nearly the same intervals D1, D2, D3. Thus, the reactive ion etching executed is uniform in width, resulting in a stable state of etching, and the cut section of the tuning-fork 4 is enhanced in verticality. That is, the dimensional accuracy of width is improved with respect to the machining method of arms 1, 2, and the resonance frequency in the driving direction (X direction) of the tuning-fork 4 becomes less in variation, thereby ensuring higher accuracy, and the sensitivity of detecting the angular velocity applied is further improved in reliability.

In the present preferred embodiment, described is an example using platinum (Pt)-titanium (Ti) or iridium (Ir)-titanium (Ti) for the lower electrode layer 40 as the first electrode, the second electrode, and the fifth electrode. However, as the lower electrode layer 40, it is more preferable to have a Ti layer disposed at the bottom (silicone 30) side and Pt—Ti layer or Ir—Ti layer disposed at the top (the first piezoelectric thin film 14, 16, the second piezoelectric thin film 15, 17, the third piezoelectric thin film 26, 27) side. In this configuration, the Ti layer is in tight contact with the silicone and the Pt—Ti layer or Ir—Ti layer, and the Pt—Ti layer or Ir—Ti layer can improve the orientation of piezoelectric thin film such as PZT.

Also, in the present preferred embodiment, a configuration with piezoelectric thin film 41 directly disposed on the lower electrode layer 40 made from platinum (Pt)-titanium (Ti) or iridium (Ir)-titanium (Ti) is described as an example. However, it is more preferable to be configured so that lead titanate layer with lanthanum (La) and magnesium (Mg) added, (so-called PLMT), is disposed between the Pt—Ti layer and piezoelectric thin film. Due to this configuration, it is possible to widen the allowable range of the manufacturing conditions in order to obtain proper orientation of a piezoelectric thin film such as PZT.

Also, in the present preferred embodiment, described is an example using lead titanate zirconate (PZT) as the piezoelectric thin film. However, it is also possible to form the piezoelectric thin film by using a lead titanate zirconate (PZT) type to which is added at least one of those selected from magnesium (Mg), niobium (Nb), and manganese (Mn). Due to this configuration, same as for PZT, the piezoelectric constant of the piezoelectric thin film is larger, the electrical-mechanical conversion efficiency is higher, and it is possible to improve the sensitivity of detection signal with respect to the angular velocity applied. Also, in the present preferred embodiment, the piezoelectric thin film 41 comprises PZT or a PZT type to which is added at least one of those selected from Mg, Nb, Mn. One face of the crystalline structure of the piezoelectric thin film 41 is preferentially oriented in parallel with the main face of arm 1, 2. According to the level of preferential orientation, the angles of a plurality of polarizing vectors are equalized as against the direction of the driving electric field applied, thereby stabilizing the detection signal with respect to the angular velocity applied.

Preferably, the crystalline structure of piezoelectric thin film 41 is a rhombohedral structure or a tetragonal structure, and the (001) face thereof is preferentially oriented in parallel with the main face of arm 1, 2. Due to the structure, the piezoelectric characteristic of the piezoelectric thin film 41 will not have non-linearity to the applied voltage, and it is possible to excecute more reliable drive of the angular velocity sensor and to detect the angular velocity.

Also, preferably for other purposes, the crystalline structure of the piezoelectric thin film 41 is a rhombohedral structure or a tetragonal structure, and the (111) face is preferentially oriented in parallel with the main face of arm 1, 2. Due to this structure, the piezoelectric characteristic of piezoelectric thin film 41 will have non-linearity to the applied voltage, but the higher the voltage to be applied, the higher is the piezoelectric characteristic, and it is effective when greater driving amplitude is required.

Also, in the present preferred embodiment, the configuration described as an example is such that the driving section is disposed at closer to the end side than the center of arm 1, 2, and the detecting section is disposed between the center of arm 1, 2 and near the base 3. However, it is more preferable to dispose the driving section between near the center of at least any one main face of at least either of the arms 1, 2 and near the base 3, and to dispose the detecting section a little closer to the end of arm 1, 2 than to the first electrode 10, 12 and the second electrode 11, 13 forming the driving section. Due to this configuration, it becomes possible to lessen the admittance at the resonance frequency in the secondary mode of arm 1, 2, thereby enhancing the stability of oscillation and ensuring higher accuracy of the detection signal with respect to the angular velocity applied.

(Preferred Embodiment 2)

FIG. 7 is a layout drawing of a silicone substrate in the preferred embodiment 2 of an angular velocity sensor of the present invention. In the preferred embodiment 2, the same component parts as those in the preferred embodiment 1 are given the same reference numerals, and the detailed description is omitted, and only differences will be described in detail. In the preferred embodiment 2, the difference from the preferred embodiment 1 is the arrangement of the angular velocity sensor in the silicone substrate.

In FIG. 7, orientation-flat 50 is perpendicular to the main face 5 of silicone substrate 30 of crystal orientation (100), and also, perpendicular to <01-1> azimuth. Since the selection is made so that the lengthwise direction (Y direction) of arm 1, 2 corresponds to <01-1> azimuth, the driving direction (X direction) corresponds to <011> azimuth. Accordingly, as shown in FIG. 5, <011> azimuth that corresponds to the driving direction (X direction) becomes less in variation of elastic modulus as against the angular deflection of azimuth, and the elastic modulus is further increased with respect to the driving direction (X direction). Consequently, the variations of resonance frequency in the driving direction (X direction) of tuning-fork 4 are reduced to a low level, and the elastic modulus itself is great. Accordingly, it is possible to enhance the resonance frequency in the driving direction (X direction) of the tuning-fork 4, improving the reliability of the sensitivity of detection signal with respect to the angular velocity applied, and to make the sensitivity itself higher.

In the preferred embodiments 1 and 2, the tuning-fork 4 comprising two arms 1, 2, and base 3 has been described. However, it is also possible for the present invention to have one arm or three or more arms. That is, selecting a crystal orientation that lessens the variation of elastic modulus as against the angular deflection of azimuth, which is the technical concept of the present invention, it is possible to lessen the variation of resonance frequency in the driving direction and to improve the reliability of the sensitivity of detection signal with respect to the angular velocity applied.

As described above, in the present invention, an angular velocity sensor comprising a vibrator, the vibrator is formed of a silicone substrate with crystal orientation (100) as its main face, and is further configured in that a face nearly perpendicular to the driving direction of the vibrator corresponds to a crystal orientation where the elastic modulus is less dependent upon azimuth angle. Accordingly, even when the crystal orientation is somewhat deflected, the variations of driving resonance frequency of the vibrator can be reduced to a low level, and it is possible to improve the reliability of the sensitivity of detection signal with respect to the angular velocity applied.

In the present invention, as mentioned earlier, the selection is made so that the side face of the arm corresponds to a crystal orientation where the elastic modulus is less dependent upon azimuth angle. In this way, even when the crystal orientation is somewhat deflected, the variations of driving resonance frequency of the tuning-fork can be reduced to a low level, and it is possible to improve the reliability of the sensitivity of detection signal with respect to the angular velocity applied.

Also in the present invention, as mentioned earlier, the side face of the arm corresponds to a crystal orientation of (010) or (001). Thus, even when the crystal orientation is somewhat deflected, the variations of driving resonance frequency of the tuning-fork can be reduced to a low level, and it is possible to improve the reliability of the sensitivity of detection signal with respect to the angular velocity applied.

Also in the present invention, as mentioned earlier, the side face of the arm corresponds to <011> azimuth. Thus, even when the crystal orientation is somewhat deflected, the variations of driving resonance frequency of the tuning-fork can be reduced to a low level. Further, since the elastic modulus itself is great, the driving resonance frequency of the tuning-fork can be enhanced, and it is possible to improve the reliability of the sensitivity of detection signal with respect to the angular velocity applied and to make the sensitivity itself higher.

Also in the present invention, as mentioned earlier, the thickness in the detecting direction (Z direction) of the arm is less than the thickness in the driving direction (X direction). Thus, it is possible to reduce the thickness of the angular velocity sensor.

Also in the present invention, as mentioned earlier, the first electrode, the second electrode, and the fifth electrode are formed of alloy layers made from noble metal and liable-to-oxide material. Thus, the alloy layer made from noble metal and liable-to-oxide material can improve the orientation of the piezoelectric thin film such as PZT.

Also in the present invention, as mentioned earlier, the noble metal comprises Pt or Ir. Thus, the noble metal comprising Pt or Ir can improve the orientation of the piezoelectric thin film such as PZT.

Also in the present invention, as mentioned earlier, the alloy layer made from noble metal and liable-to-oxide material is formed of the Pt—Ti layer or Ir—Ti layer. Thus, the alloy layer comprising the Pt—Ti layer or Ir—Ti layer can further improve the orientation of the piezoelectric thin film such as PZT.

Also in the present invention, as mentioned earlier, the first electrode, the second electrode, and the fifth electrode are formed of the Ti layer disposed at the bottom and Pt—Ti layer or Ir—Ti layer disposed at the top. Thus, the Ti layer is in tight contact with the silicone and the Pt—Ti layer or Ir—Ti layer, and the Pt—Ti layer or Ir—Ti layer can improve the orientation of the piezoelectric thin film such as PZT.

Also in the present invention, as mentioned earlier, between the Pt—Ti layer and the piezoelectric thin film, or between the Ir—Ti layer and the piezoelectric thin film, a lead titanate layer with lanthanum (La) and magnesium (Mg) added, (so-called PLMT), is disposed. Thus, it is possible to expand the allowable range of manufacturing conditions for obtaining proper orientation of the piezoelectric thin film such as PZT.

Also in the present invention, as mentioned earlier, the piezoelectric thin film comprises lead titanate zirconate (PZT), or a lead titanate zirconate (PZT) type to which at least one of Mg, Nb, and Mn is added. Thus, the piezoelectric constant of the piezoelectric thin film becomes larger and the electrical-mechanical conversion efficiency is enhanced, and it is possible to improve the sensitivity of detection signal with respect to the angular velocity applied.

Also in the present invention, as mentioned earlier, one face of the crystalline structure is preferentially oriented to the main face of the arm. According to the level of preferential orientation, the angles of a plurality of polarizing vectors are equalized as against the direction of the driving electric field applied, thereby stabilizing the detection signal with respect to the angular velocity applied.

Also in the present invention, as mentioned earlier, as the piezoelectric thin film, the crystalline structure is a rhombohedral structure or a tetragonal structure, and the (001) face is preferentially oriented in parallel with the main face of the arm. Thus, the piezoelectric characteristic of the piezoelectric thin film will not have non-linearity to the applied voltage, and it is possible to excecute more reliable drive of the angular velocity sensor and to detect the angular velocity.

Also in the present invention, as mentioned earlier, for other purposes, as the piezoelectric thin film, the crystalline structure is a rhombohedral structure or a tetragonal structure, and the (111) face is preferentially oriented in parallel with the main face of the arm. Thus, the piezoelectric characteristic of the piezoelectric thin film will have non-linearity to the applied voltage, but the higher the voltage to be applied, the higher is the piezoelectric characteristic, and it is effective when greater driving amplitude is required.

Also in the present invention, as mentioned earlier, the driving section is disposed between near the center of the main face of at least one of the arms and near the substrate, and the detecting section is disposed closer to the end of the arm than to the first electrode and the second electrode. Thus, it becomes possible to lessen the admittance at the resonance frequency in the secondary mode of the arm, thereby enhancing the stability of oscillation and the accuracy of detection signal with respect to the angular velocity applied.

Also in the present invention, as mentioned earlier, by induction coupling type reactive ion etching with use of at least two or more kinds of gasses, a silicone substrate with crystal orientation (100) as its main face is subjected to vertical etching to form the tuning-fork. Thus, it is possible to ensure more accurate perpendicularity between the main face and the side of the arm.

INDUSTRIAL APPLICABILITY

The angular velocity sensor of the present invention comprises a vibrator formed of a silicone substrate with crystal orientation (100) as its main face, which is configured in that a face nearly perpendicular to the driving direction of the vibrator corresponds to a crystal orientation where the elastic modulus is less dependent upon azimuth angle. Thus, the angular velocity sensor of the present invention is able to lessen the variation of driving resonance frequency of the vibrator and to improve the reliability of the sensitivity of detection signal with respect to the angular velocity applied.

What is claimed is:

1. An angular velocity sensor comprising a vibrator, wherein the vibrator is formed of a silicone substrate with face orientation (100) as its main face, and a face nearly perpendicular to a driving direction of the vibrator corresponds to a crystal orientation where elastic modulus is less in variation as against deflection of azimuth angle.

2. The angular velocity sensor of claim 1, wherein said vibrator comprises:
a driving section comprising:
a tuning-fork having an arm and a substrate connected to the arm;
a first electrode and a second electrode disposed so as to be spaced apart across a center line on a main face of the arm;
a first piezoelectric thin film and a second piezoelectric thin film respectively disposed on the first electrode and the second electrode; and
a third electrode and a fourth electrode respectively disposed on the first piezoelectric thin film and the second piezoelectric thin film; and
a detecting section having:
a fifth electrode disposed so as to be spaced apart from the first electrode and the second electrode;
a third piezoelectric thin film disposed on the fifth electrode; and
a sixth electrode disposed on the third piezoelectric thin film;

wherein a side face nearly perpendicular to a driving direction (X direction) of the arm corresponds to a crystal orientation where elastic modulus is less in variation as against deflection of azimuth angle;
wherein the tuning-fork resonates in the driving direction (X direction) when AC voltages opposite in phase to each other are applied to the third electrode and the fourth electrode; and
wherein the sixth electrode detects electric charge generated due to oscillation caused by Corioli's force produced in a detecting direction (Z direction) that is perpendicular to the main face of the arm with angular velocity applied.

3. The angular velocity sensor of claim 2, wherein a side face of the arm corresponds to (010) crystal orientation or (001) crystal orientation.

4. The angular velocity sensor of claim 2, wherein a side face of the arm corresponds to (011) crystal orientation.

5. The angular velocity sensor of claim 2, wherein the arm is thinner in the detecting direction (Z direction) than in the driving direction (X direction).

6. The angular velocity sensor of claim 2, wherein the first electrode, the second electrode, and the fifth electrode are formed of alloy layers made from noble metal and liable-to-oxide material.

7. The angular velocity sensor of claim 6, wherein the noble metal includes at least any one of platinum (Pt) and iridium (Ir).

8. The angular velocity sensor of claim 6, wherein each of the alloy layers is a platinum (Pt)-titanium (Ti) layer or an iridium (Ir)-titanium (Ti) layer.

9. The angular velocity sensor of claim 2, wherein the first electrode, the second electrode, and the fifth electrode comprise:
titanium (Ti) layers disposed as lower layers; and
platinum (Pt)-titanium (Ti) layer or iridium (Ir)-titanium (Ti) layer disposed as upper layer.

10. The angular velocity sensor of claim 9, further comprising a lead titanate layer with lanthanum (La) and magnesium (Mg) added, (so-called PLMT layer)
wherein the PLMT layer is disposed between the platinum (Pt)-titanium (Ti) layer and the piezoelectric thin films, or between the iridium (Ir)-titanium (Ti) layer and the piezoelectric thin films.

11. The angular velocity sensor of claim 2,
wherein the first piezoelectric thin film, the second piezoelectric thin film, and the third piezoelectric thin film are made from lead titanate zirconate (PZT) or lead titanate zirconate (PZT) type; and
wherein at least one of Mg, Nb, and Mn is added to the lead titanate zirconate (PZT) type.

12. The angular velocity sensor of claim 11,
wherein the first piezoelectric thin film, the second piezoelectric thin film, and the third piezoelectric thin film are such that one face of crystalline structures of these is preferentially oriented in parallel with the main face of the arm.

13. The angular velocity sensor of claim 12,
wherein each of the crystalline structures is a rhombohedral structure or a tetragonal structure; and
wherein the preferentially oriented face corresponds to (001) crystal orientation.

14. The angular velocity sensor of claim 12,
wherein each of the crystalline structures is a rhombohedral structure or a tetragonal structure; and wherein the preferentially oriented face corresponds to (111) crystal orientation.

15. The angular velocity sensor of claim 2,
wherein the driving section is disposed between a center of the main face of the arm and the substrate; and
wherein the detecting section is disposed closer to the end of an arm than to the first electrode and the second electrode.

* * * * *

UNITED STATES PATENT AND TRADEMARK OFFICE
CERTIFICATE OF CORRECTION

| | | |
|---|---|---|
| PATENT NO. | : 6,865,945 B2 | |
| APPLICATION NO. | : 10/485073 | |
| DATED | : March 15, 2005 | |
| INVENTOR(S) | : Michihiko Hayashi | |

It is certified that error appears in the above-identified patent and that said Letters Patent is hereby corrected as shown below:

ON THE TITLE PAGE:
In item (56) under the heading "OTHER PUBLICATIONS":

In line 1, replace "silicone" with --silicon--;

In item (57) under the ABSTRACT heading:

In line 6, replace "silicone" with --silicon--;

IN THE SPECIFICATION:

Column 1, line 16, replace "silicone" with --silicon--;
Column 2, line 13, replace "silicone" with --silicon--;
          line 26, replace "silicone" with --silicon--;
          line 27, replace "silicone" with --silicon--;
          line 31, replace "silicone" with --silicon--;
          line 36, replace "silicone" with --silicon--;
          line 63, replace "silicone" with --silicon--;
          line 64, replace "silicone" with --silicon--;
          line 67, replace "silicone" with --silicon--;
Column 3, line 8, replace "silicone" with --silicon--;
          line 10, replace "silicone" with --silicon--;
          line 11, replace "silicone" with --silicon--;
Column 5, line 45, replace "silicone" with --silicon--;
          line 50, replace "silicone" with --silicon--;
          line 54, replace "silicone" with --silicon--;
          line 59, replace "silicone" with --silicon--;
          line 65, replace "silicone" with --silicon--;

Signed and Sealed this
Fourteenth Day of January, 2014

Michelle K. Lee
*Deputy Director of the United States Patent and Trademark Office*

CERTIFICATE OF CORRECTION (continued)
U.S. Pat. No. 6,865,945 B2

IN THE SPECIFICATION:

Column 6, line 22, replace "silicone" with --silicon--;
          line 38, replace "silicone" with --silicon--;
          line 43, replace "silicone" with --silicon--;
Column 7, line 14, replace "silicone" with --silicon--;
          line 16, replace "silicone" with --silicon--;
          line 18, replace "silicone" with --silicon--;
          line 28, replace "silicone" with --silicon--;
          line 33, replace "silicone" with --silicon--;
          line 39, replace "silicone" with --silicon--;
          line 40, replace "silicone" with --silicon--;
          line 43, replace "silicone" with --silicon--;
          line 58, replace "silicone" with --silicon--;
          line 63, replace "silicone" with --silicon--;
Column 8, line 63, replace "silicone" with --silicon--;
Column 9, line 4, replace "silicone" with --silicon--;
          line 6, replace "silicone" with --silicon--;
          line 36, replace "silicone" with --silicon--;
Column 10, line 30, replace "silicone" with --silicon--;
Column 11, line 21, replace "silicone" with --silicon--;
          line 29, replace "silicone" with --silicon--.

IN THE CLAIMS:

Column 11, line 41 (claim 1, line 2), replace "silicone" with --silicon--.